US006188731B1

United States Patent
Kim

(10) Patent No.: US 6,188,731 B1
(45) Date of Patent: Feb. 13, 2001

(54) APPARATUS AND METHOD FOR SYNCHRONIZING AUDIO/VIDEO SIGNAL

(75) Inventor: Seung Man Kim, Suwon (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/087,998

(22) Filed: Jun. 1, 1998

(30) Foreign Application Priority Data

May 30, 1997 (KR) .................................................. 97-22277

(51) Int. Cl.$^7$ ........................................................ H04N 7/54
(52) U.S. Cl. .................. 375/240.28; 348/632; 455/194.1
(58) Field of Search .............................. 375/240.28, 368; 348/632; 714/812; 455/194.1

(56) References Cited

U.S. PATENT DOCUMENTS

| 4,641,190 | * | 2/1987 | Testin et al. ........................ 348/632 |
| 5,276,714 | * | 1/1994 | Hori et al. ........................... 375/368 |
| 5,381,186 | * | 1/1995 | Lee .................................. 348/632 X |
| 5,621,772 |   | 4/1997 | Maturi et al. ....................... 375/366 |

* cited by examiner

Primary Examiner—Howard Britton
(74) Attorney, Agent, or Firm—Robert E. Bushnell, Esq.

(57) ABSTRACT

An apparatus and method for synchronizing audio and video signals wherein the motion of a picture is detected in case of occurring timing difference between the audio and video signals and subsequently a threshold is adjusted in association with the detected motion of the picture, thereby controlling the mute audio signal. An apparatus for synchronizing audio/video comprises an inverse transport processor for outputting compressed audio and video signals and further detecting a motion of picture to output a variable associated with the motion of picture, a video decompressor for decompressing the compressed video signal from the inverse transport processor, an audio decompressor for decompressing the compressed audio signal from the inverse transport processor, a microprocessor for processing the audio and video signals outputted from the audio decompressor and the video decompressor respectively to generate a synchronization error signal, and a threshold detector for generating audio muting signal, responsive to the variable from the inverse transport processor and the synchronization error signal from the microprocessor.

8 Claims, 4 Drawing Sheets

US 6,188,731 B1

APPARATUS AND METHOD FOR SYNCHRONIZING AUDIO/VIDEO SIGNAL

CLAIM OF PRIORITY

This application makes reference to, incorporates the same herein, and claims all benefits accruing under 35 U.S.C §119 from an application entitled Apparatus And Method For Synchronizing Audio/Video Signal earlier filed in the Korean Industrial Property Office on May 30, 1997, and there duly assigned Ser. No. 97-22277 by that Office.

BACKGROUND OF THE INVENTION

1. Field of the Invention

The present invention relates to an apparatus and method for synchronizing audio/video signal and, more particularly, to an apparatus and method for detecting motion of picture when timing difference between audio signal and video signal transmitted occurs and subsequently adjusting a threshold in association with the detected motion of picture, thereby controlling the mute audio signal.

2. Description of the Prior Art

MPEG is a compressed audio/video signal protocol established by the Moving Pictures Experts Group of the International Standardization Organization. One description of MPEG is provided in U.S. Pat. No. 5,621,772 to Greg Maturi et al. entitled Hysteretic Synchronization System For MPEG Audio Frame Decoder.

In general, an audio/video signal is compressed according to an MPEG protocol. According the MPEG protocol, the compressed audio/video signal is segmented into packets for transmission and subsequently the compressed audio signal is time division multiplexed with the compressed video signal.

The associated compressed audio/video signal is not only asynchronous, but their mutual timing relationship or synchronism is nonexistent in transmission.

Accordingly, when an audio/video signal compressed according to an MPEG protocol is decompressed to display on screen, the audio signal must be synchronized with the video signal so that a voice is coincident with a corresponding picture.

A timing difference between the audio and video signals, however, may sometimes occur when the compressed audio/video signal is decompressed. When the timing difference between the audio and video signals occurs, the audio signal should be muted to be in synchronization with video signal so that a voice is coincident with a corresponding picture.

However, decompression in the art is problematic in that it cannot determine the degree of motion of a picture since the mute of the audio signal for synchronization is based on comparison between a previous or subsequent frames to picture, thereby frequently muting the audio signal unnecessarily.

SUMMARY OF THE INVENTION

It is an object of the present invention to provide an apparatus and method for synchronizing an audio/video signal wherein a variable associated with the motion of a picture is utilized to determine a threshold according to which the mute of audio signal is adjusted.

To achieve the above-mentioned object, an apparatus for synchronizing audio/video signal according to the present invention comprises an inverse transport processor for outputting compressed audio/video signal and further detecting a motion of picture to output a variable associated with the motion of picture, a video decompressor for decompressing the compressed video signal from the inverse transport processor, an audio decompressor for decompressing the compressed audio signal from the inverse transport processor, a microprocessor for processing the audio/video signal outputted from the audio decompressor and the video decompressor respectively to generate a synchronization error signal, and a threshold detector for generating audio muting signal, responsive to the variable from the inverse transport processor and the synchronization error signal from the microprocessor. The microprocessor comprises a first latch, a second latch, a first subtracter, a second subtracter and a third subtracter.

Further objects, features and other aspects will be understood from the following detailed description of preferred embodiments of the present invention referring to the accompanying drawings.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
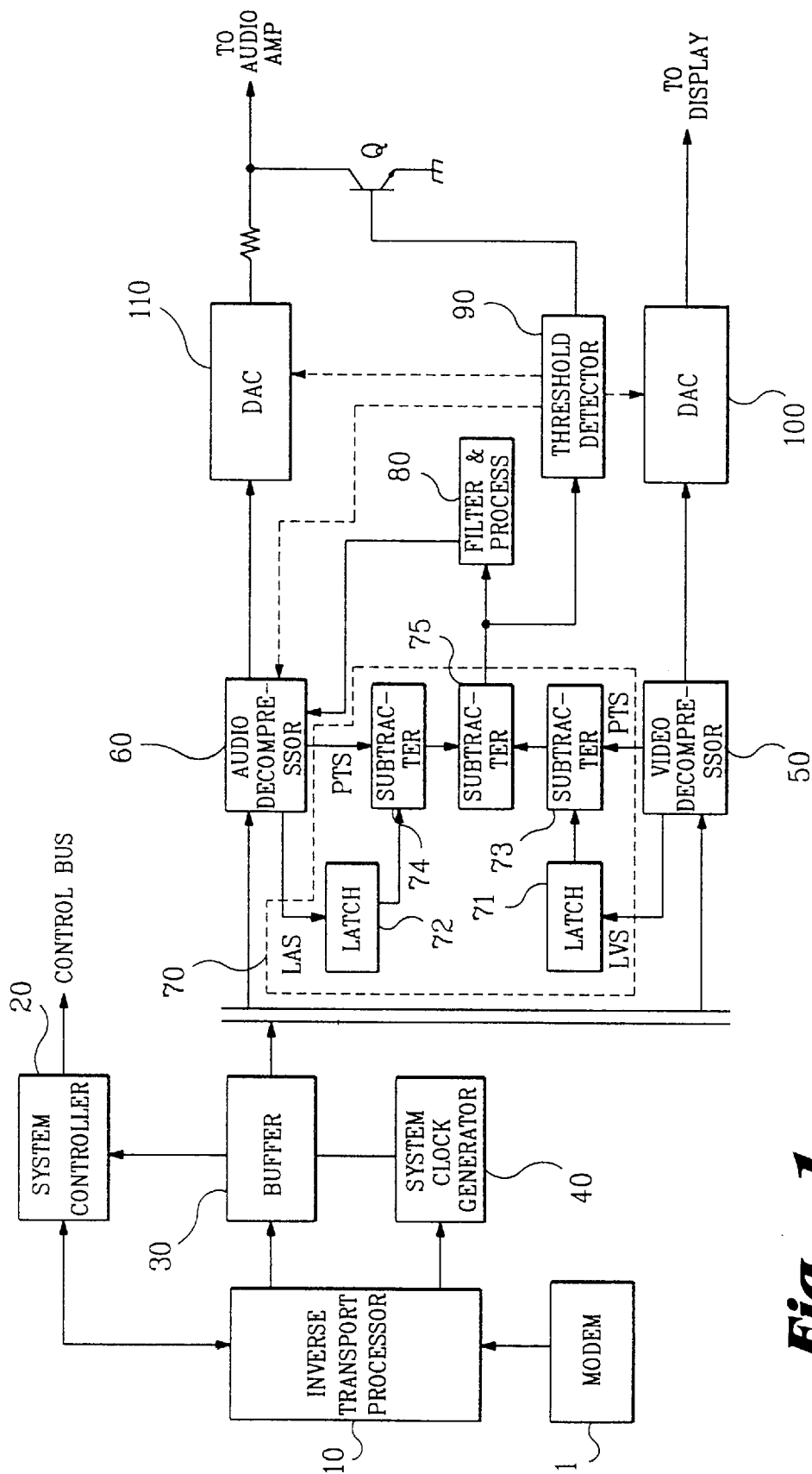
FIG. 1 is a schematic block diagram view of an exemplary apparatus for synchronizing audio/video signal.

FIG. 1 is a schematic block diagram to illustrate decompression of audio and video signal according to an exemplary synchronizing apparatus.

An inverse transport processor 10 receives compressed audio and video signals from a modem 1. Inverse transport processor 10 then divides respective transport packets by service and allocates the respective transport packets to different memory blocks in a buffer 30. The inverse transport processor 10 provides a control signal to a system clock generator 40, which, responsive to the control signal, generates a system clock signal synchronous with the inverse transport processor operation.

A video decompressor 50, responsive to compressed video data from buffer 30, provides a decompressed video signal for display or for storage in a storage device (not shown). An audio decompressor 60, responsive to compressed audio data from buffer 30, provides a decompressed audio signal for reproduction via a speaker or for storage in a storage device (not shown).

A microprocessor 70 comprises a first latch 71, a second latch 72, a first subtracter 73, a second subtracter 74, and a third subtracter 75. Microprocessor 70 processes the respective decompressed audio and video signals from video decompressor 50 and audio decompressor 60 to generate a synchronization error signal.

A filter and processing element 80 receives and smooths the synchronization error signal from microprocessor 70 to minimize aberrant effects caused by signal noise. Filter and processing element 80 determines whether a skip or repeat of the audio signal should be utilized to effect coarse synchronization of the audio and video signals and whether an adjustment to the audio processing frequency should be utilized to effect fine synchronization.

A threshold detector 90 generates a muting control signal, responsive to the synchronization error signal from microprocessor 70.

A first digital-to-analog converter (DAC) 100 converts digital signals from video decompressor 50 into corresponding analog signals, which are output to a display. A second digital-to-analog converter 110 converts digital signals from audio decompressor 60 into corresponding analog signals, which are output to an audio amplifier.

A resistor is connected between an output terminal of DAC 110 and a collector terminal of a transistor Q, and an output terminal of threshold detector 90 is coupled to a base terminal of transistor Q.

Inverse transport processor 10 receives compressed audio and video signals, which are transmitted in a form of packets. Subsequently, inverse transport processor 10 divides respective transport packets and allocates the respective transport packets to different memory blocks in buffer 30. Furthermore, inverse transport processor 10 outputs information data regarding the packets to system controller 20 which then outputs a control signal to a control bus.

System controller 20 is provided with a clock signal for synchronization from system clock generator 40.

Compressed video data from buffer 30 are received by video decompressor 50, which generates a decompressed video signal for display or for storage in a storage device (not shown). In addition, compressed audio data from buffer 30 are received by audio decompressor 60, which generates a decompressed audio signal for reproduction via a speaker or for storage in a storage device (not shown).

Microprocessor 70 processes decompressed audio and video signals from video decompressor 50 and audio decompressor 60 to generate a synchronization error signal.

More particularly, a first subtracter 73 generates a difference $\Delta_{V\text{-}PTS}$ between timing reference signals ($PTS_{vid}$; Presentation Time Stamps) and a local video stamp (LVS) signal applied to first latch 71, wherein $PTS_{vid}$ is generated when each video frame is output from video decompressor 50. Second subtracter 74 generates a difference $\Delta_{A\text{-}PTS}$ between timing reference signals ($PTS_{and}$; Presentation Time Stamps) and a local audio stamp (LAS) signal applied to second latch 72, wherein $PTS_{and}$ is generated when each audio frame is output from audio decompressor 60. Subsequently, the difference $\Delta_{V\text{-}PTS}$ between $PTS_{vid}$ and LVS from first subtracter 73 and the difference $\Delta_{A\text{-}PTS}$ between $PTS_{and}$ and LAS from second subtracter 74 are respectively applied to third subtracter 75 to generate a synchronization error signal, which signal corresponds to the difference between $\Delta_{V\text{-}PTS}$ and $\Delta_{A\text{-}PTS}$. Accordingly, the synchronization error signal from microprocessor 70 will be driven to zero when the audio and video signal are in synchronization.

The synchronization error signal is applied to filter and processing element 80, which smooths the synchronization error signal to minimize aberrant effects caused by signal noise. Filter and processing element 80 further determines whether a skip or repeat of the audio signal should be utilized to effect coarse synchronization of the audio and video signal and whether an adjustment to the audio processing frequency should be utilized to effect fine synchronization.

The synchronization error signal generated by microprocessor 70 is applied to threshold detector 90, which generates the muting control signal responsive to the synchronization error signal when the audio signal is not in synchronization with the video signal.

Accordingly, responsive to the muting control signal from threshold detector 90, transistor Q operates to disable the output of DAC 110 or, alternatively, the output of audio decompressor 60, thereby muting the audio signal. In other words, the audio signal from second DAC 110 is muted according to the muting control signal for synchronization with the video signals when the timing difference between the audio and video signals occurs.

Figure 2:
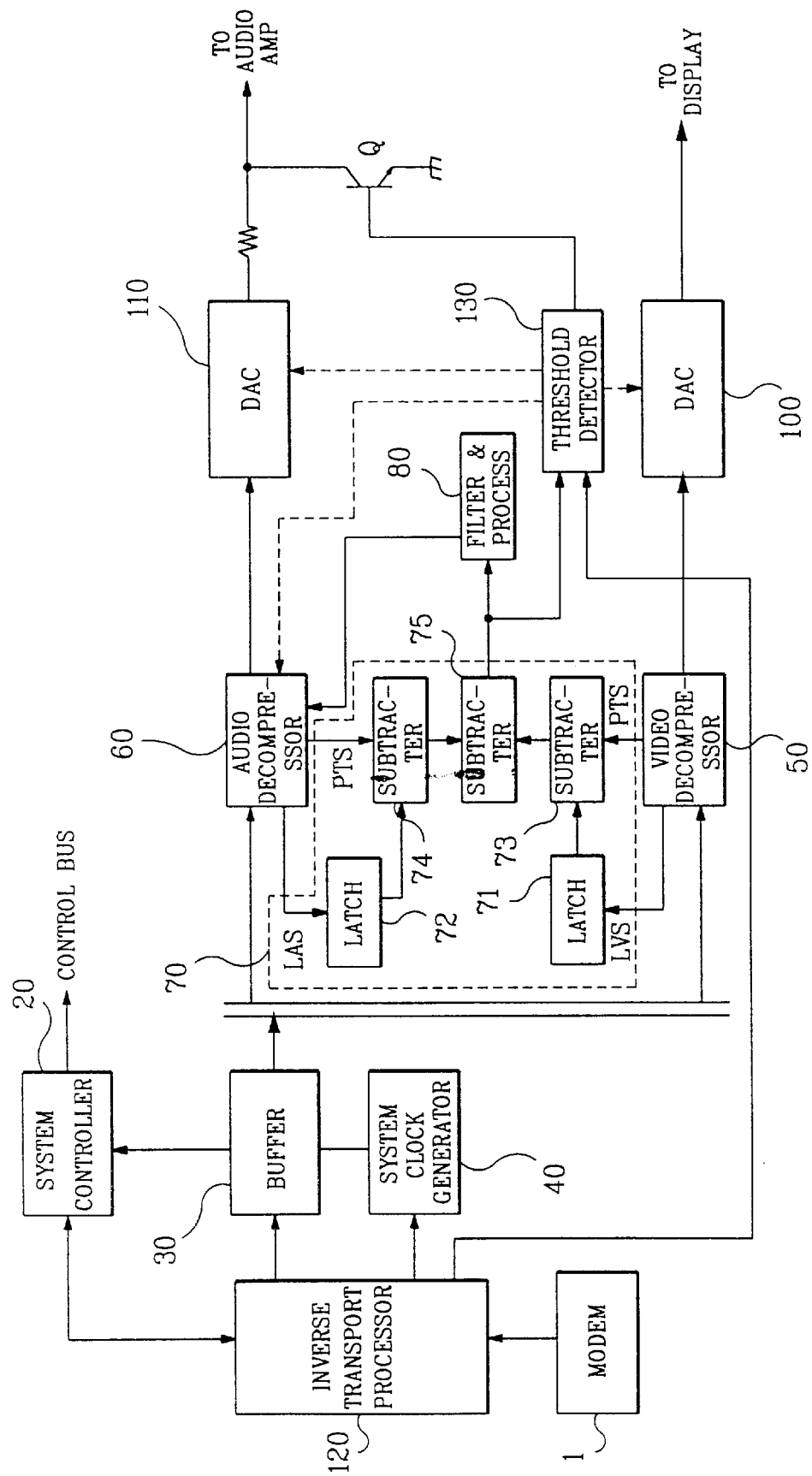
FIG. 2 is a schematic block diagram view of an embodiment according to the present invention.

FIG. 2 is a schematic block diagram view of an embodiment according to the present invention, wherein the same elements as those in FIG. 1, labeled with the same numerals as in FIG. 1, are not further explained in detail below since they serve the same function as in FIG. 1.

An inverse transport processor 120 divides respective transport packets and allocates the respective transport packets to different memory blocks in buffer 30. Furthermore, the inverse transport processor 120 detects the degree of motion on a picture to output a corresponding variable.

A threshold detector 130 receives the variable from inverse transport processor 120 and adjusts a threshold value accordingly. Threshold detector 120 then generates the muting control signal, dependent upon the value of the synchronization error signal from microprocessor 70 as compared to the adjusted threshold value.

A preferred embodiment according to the present invention will be described below referring to FIG. 3 and FIGS. 4a and 4b.

Figure 3:
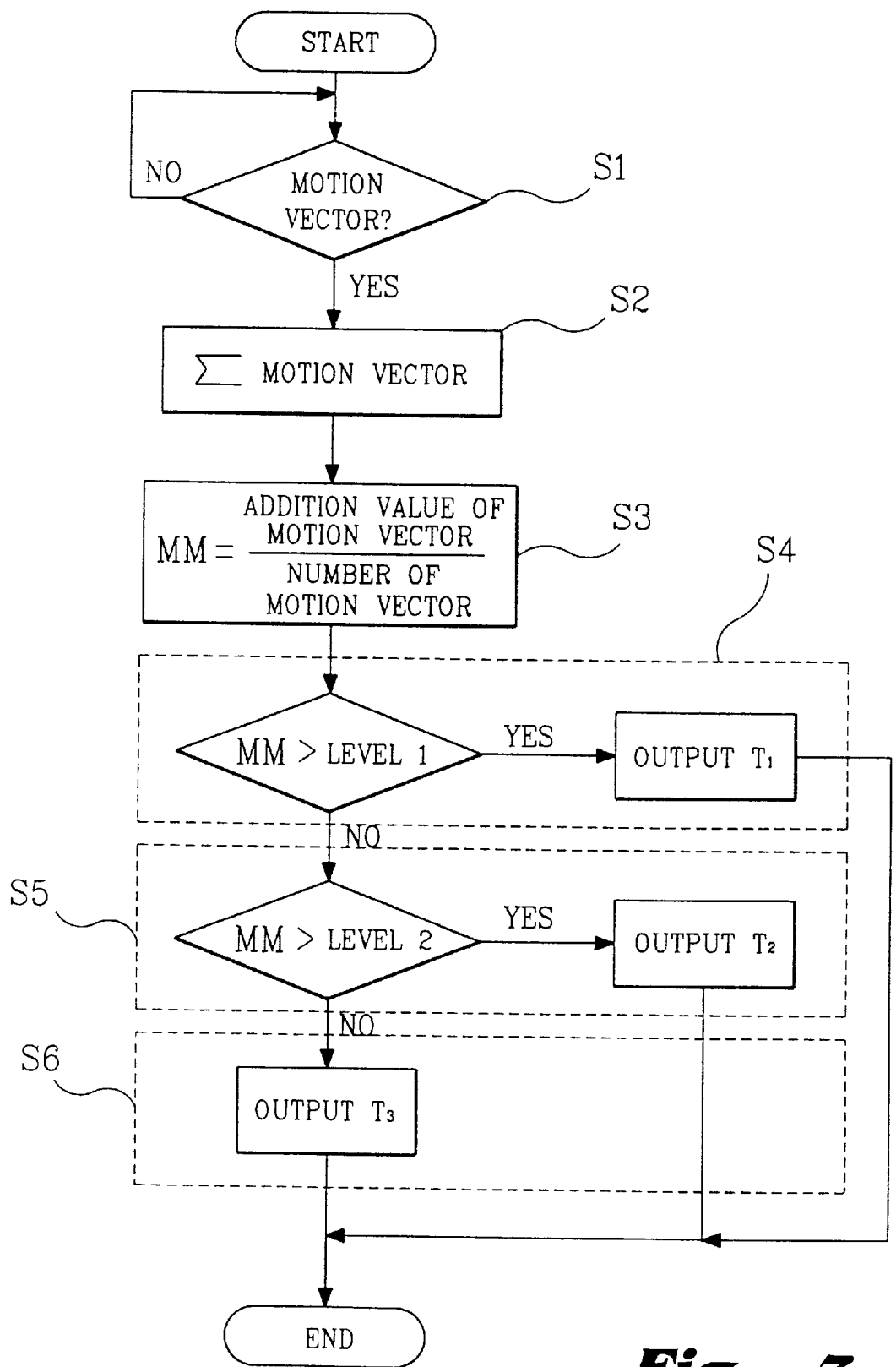
FIG. 3 is a flow chart illustrating the synchronizing operation of the apparatus, shown in FIG. 2, in detail.

A flow chart of FIG. 3 shows the method of detecting the degree of the motion of a picture and subsequently adjusting a variable associated with a threshold when the picture is reproduced. FIG. 3 illustrates an embodiment wherein the level value according to the motion of a picture and corresponding threshold are set in three stages respectively in the inverse transport processor 120. Provided that the timing difference between the audio and video signals occurs while the compressed audio and video signals are decompressed for reproduction, the audio signal should be muted for a predetermined time to be in synchronization with the video signal.

In order to synchronize the audio and video signals by adjusting the muting of the audio signal according to the motion of a picture, step S1 inverse transport processor 120 checks for a motion vector representing the motion of a picture. The motion vector is detected only during a moving picture, not when a picture is static.

If one or more motion vectors are detected in inverse transport processor 120, the motion vectors are added together to generate an addition value in step S2.

Subsequently, a value MM representing division of the addition value by the number of motion vectors is generated in step S3.

A variable T1 is output to threshold detector 130 if MM is greater than level 1 when compared with level 1 in step S4. On the other hand, a variable T2 is output to threshold detector 130 if MM is greater than level 2 when compared with level 2 in step S5. Or, in step S6, a variable T3 is output to threshold detector 130 if the value of MM is less than level 2 when compared to level 2 in step S5.

In case of threshold adjustment according to the variable from threshold detector 130 with respect to steps 4, 5 and 6 as mentioned above, the muting interval of the audio signal gets shorter or nonexistent since a picture with a lot of motion does not require synchronization with the audio signal so much.

Accordingly, threshold detector 130 receives the variable T1, T2 or T3 from inverse transport processor 120 corresponding to a threshold and further generates the muting control signal, responsive to the synchronization error signal from microprocessor 70, thereby synchronizing the audio and video signals.

Figure 4A:
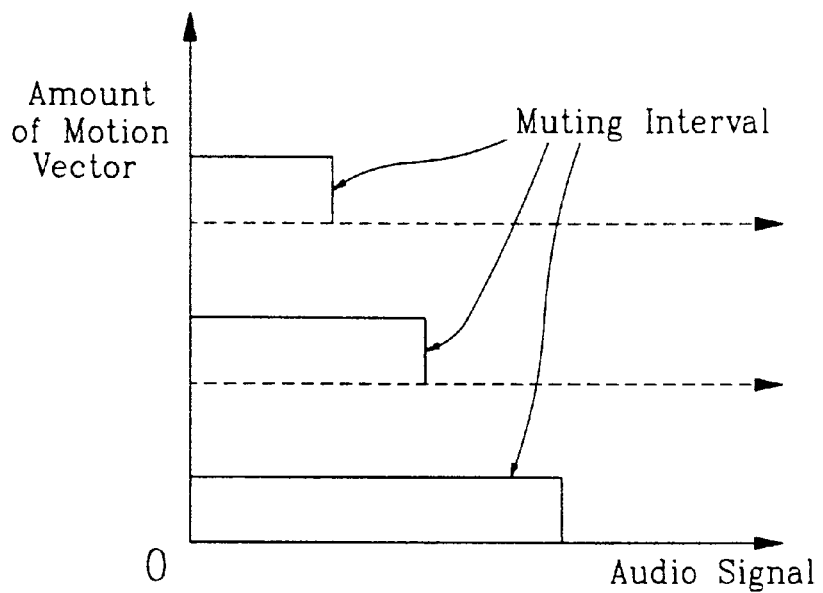
FIGS. 4a and 4b illustrate the muting of the audio signal according to a motion vector amount.
Figure 4B:
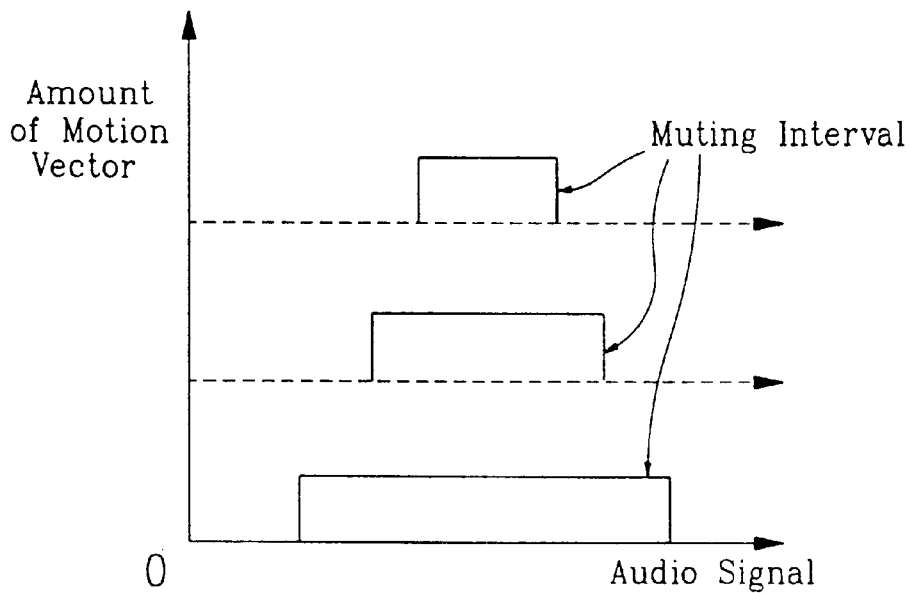

FIGS. 4a and 4b illustrates the muting of the audio signal for synchronization of the audio and video signals, which is achieved by using a threshold adjustment in association with motion vectors, i.e. the degree of motion of displayed picture.

FIGS. 4a and 4b illustrate that the more motion there is in a picture, i.e. the larger the motion vector is, then muting of the audio signal for synchronization of the audio and video signals is reduced. This results from the fact that in the greatly-moving picture human beings cannot sense inconsistency of a picture and corresponding voice to a certain extent although the picture is not precisely synchronous with its corresponding voice, that is, though a fine synchronization is not achieved in case of occurring timing difference between the audio signal and the video signal.

The present invention is to be considered as illustrative and not limited to the above-described embodiment. Although in the above-described embodiment the level value according to the motion in a picture and a corresponding threshold are set in three stages in inverse transport processor 120, the scope of the invention is considered to cover all modifications falling within the true spirit and scope of this invention, including the modifications set in other number of stages.

It is believed that an apparatus and method for synchronizing audio and video signals according to the present invention has an advantages of preventing unnecessary mute of audio signal, which advantage is achieved by making the muting interval of audio signal shorter despite some timing difference between audio and video signal in case of the greatly-moving picture compared with in case of the less moving picture.

What is claimed is:

1. An apparatus for synchronizing audio and video signals, comprising:

an inverse transport processor for outputting compressed audio and video signals and for further detecting a motion of a picture to output a variable associated with the motion of the picture;

a video decompressor for decompressing the compressed video signal from the inverse transport processor;

an audio decompressor for decompressing the compressed audio signal from the inverse transport processor;

a microprocessor for processing the decompressed audio and video signals output from the video decompressor and the audio decompressor respectively to generate a synchronization error signal;

a threshold detector for generating audio muting signal, in response to the variable from the inverse transport processor and the synchronization error signal from the microprocessor; and means for muting said decompressed audio signal in response to said audio muting signal to synchronize said decompressed audio signal and said decompressed video signal.

2. The apparatus according to claim 1, wherein the inverse transport processor provides a level value associated with the motion of the picture and a threshold corresponding to the level value, the level value and the threshold being set in a plurality of stages.

3. A method for synchronizing audio and video signals, comprising the steps of:

receiving an audio signal and video signal and checking for a motion vector;

summing all motion vectors detected to generate a addition value;

dividing the addition value by a number indicative of the number of motion vectors detected go generate an average value;

comparing the average value with a plurality of predetermined level values to output threshold variable;

adjusting a threshold in a threshold detector according to the threshold variable;

generating a error value indicative of a synchronization difference between said audio and video signals;

comparing said error value to said threshold;

muting said audio signal as a result of said comparing step to synchronize said audio signal and said video signal.

4. An apparatus for synchronizing audio and video signals, comprising:

an for receiving compressed audio and video signals provided in a MPEG (Moving Pictures Experts Group) format, said inverse transport processor separating said compressed audio signal and said compressed video signal;

said inverse transport processor further detecting motion vectors corresponding to motion of a picture of said compressed video signal and for generating a threshold value in response to the detected motion vectors;

a video decompressor for receiving and decompressing the compressed video signal from the inverse transport processor to output a decompressed video signal;

an audio decompressor for receiving and decompressing the compressed audio signal from the inverse transport processor to output a decompressed audio signal;

a microprocessor for processing the decompressed audio and video signals to generate a synchronization error signal;

a threshold detector for generating audio muting signal, in response to the threshold value from the inverse transport processor and the synchronization error signal from the microprocessor; and means for muting said decompressed audio signal in response to said audio muting signal to synchronize said decompressed audio signal and said decompressed video signal.

5. The apparatus as set forth in claim 4, wherein said inverse transport processor sum all the detected motion vectors for a picture to generate a sum value, divides the sum value by a number corresponding to the number of detected motion vectors to generate and average value and compares the average value to three predetermined level values to generate, as said threshold value, a first threshold value when said average value is greater than a first one of said predetermined level values, a second threshold value when said average value is less than said first one of said predetermined level values but greater than a second one of said predetermined level values and a third threshold value when said average value is less than said first one of said predetermined level values and less than said second one of said predetermined level values.

6. The apparatus as set forth in claim 4, wherein said microprocessor comprises:

a first latch for receiving a local video stamp signal;

a first subtracter for generating a first difference value indicative of a difference between a video timing reference signal and said local video stamp signal applied output from said first latch, wherein said video time reference signal is generated when a video frame of said decompressed video signal is output from said video decompressor;

a second latch for receiving a local audio stamp signal;

a second subtracter for generating a second difference value indicative of a difference between an audio timing reference signal and said local audio stamp signal output from said second latch, wherein said audio timing reference signal is generated when an audio frame of said decompressed audio signal is output from said audio decompressor; and a third subtracter for generating said synchronization error signal, said synchronization error signal being indicative of a difference between said first and second difference values, said synchronization error signal having a value equal to zero when the decompressed audio and video signals are in synchronization.

7. The apparatus as set forth in claim 4, further comprising:

a first digital-to-analog converter for converting said decompressed video signal into an analog video signal to be displayed; and a second digital-to-analog converter for converting said decompressed audio signal into an analog audio signal for output through a speaker.

8. The apparatus as set forth in claim 7, wherein said means for muting said decompressed audio signal comprises a transistor having a collector connected to an output of said second digital-to-analog converter via a resistor, an emitter connected to a ground terminal and a base connected to an output of said threshold detector for receiving said audio muting signal.

* * * * *